United States Patent [19]

Steele, Jr.

[11] 4,147,180

[45] Apr. 3, 1979

[54] CONDITION RESPONSIVE VALVE CONSTRUCTION

[75] Inventor: Everett T. Steele, Jr., Knoxville, Tenn.

[73] Assignee: Robertshaw Controls Company, Richmond, Va.

[21] Appl. No.: 808,875

[22] Filed: Jun. 22, 1977

[51] Int. Cl.² .......................................... F16K 15/18
[52] U.S. Cl. ............................................... 137/599.2
[58] Field of Search ..................... 137/493.1–493.5, 137/599.2

[56] References Cited

U.S. PATENT DOCUMENTS

| 3,081,919 | 3/1963 | Samuel | 137/599.2 X |
| 3,363,947 | 1/1968 | Cagle | 137/599.2 X |

FOREIGN PATENT DOCUMENTS 101680  1/1937  Australia ............................ 137/493.3

Primary Examiner—Robert G. Nilson
Attorney, Agent, or Firm—Candor, Candor & Tassone

[57] ABSTRACT

The condition responsive valve construction has a valve seat disposed between a pair of ports to interconnect the same together and has a valve member for opening and closing the valve seat in response to a condition sensed thereby, a by-pass passage being provided in the valve member for fluidly interconnecting the ports together event though the valve seat is closed by the valve member. The by-pass passage has a check valve therein to permit fluid flow through the by-pass passage in only one direction. The valve construction has a restrictor unit fluidly interconnecting the ports together even though the valve seat is closed by the valve member and the by-pass passage is closed by the check valve.

9 Claims, 6 Drawing Figures

CONDITION RESPONSIVE VALVE CONSTRUCTION

This invention relates to an improved condition responsive valve construction and method of making the same as well as to an improved control system for an internal combustion engine utilizing such a condition responsive valve construction or the like.

It is well known to provide a vacuum control system for an internal combustion engine wherein a temperature responsive valve construction will interconnect the vacuum manifold to a vacuum operated control device when the temperature of the engine is above a certain temperature. However, when the temperature of the engine is below that certain temperature the manifold will only be interconnected to the control device when the vacuum value of the manifold is greater than the vacuum value at the control device because a check valve arrangement that is remote from the temperature responsive valve construction will disconnect the manifold from the control device should the manifold vacuum value become less than the vacuum value of the control device when the temperature of the engine is below the certain temperature.

For example, present trapped spark emission control systems for automobiles each utilizes a separate one-way vacuum check valve plumbed to a two port normally closed temperature responsive valve construction that has one port thereof interconnected to the carburetor and the other port thereof interconnected to the distributor. In the cold mode of operation, vacuum is transmitted directly from the carburetor port to the distributor through the check valve and during any engine accelerations (or any quick losses of vacuum at the carburetor) the vacuum signal is trapped in the distributor by the check valve. In some applications, the trapped vacuum at the distributor is bled off slowly through an orifice over a five or six second time period. It has been found that such operation provides for improved automobile driveability while the engine is in its initial warm-up stage.

However, after the engine has warmed up so as to cause the temperature responsive valve construction to be in its open condition and, thus, in its hot mode, the carburetor port is connected directly to the distributor through the now open valve construction at all times without any checks or delays.

Accordingly, it is a feature of this invention to provide an improved temperature responsive valve construction for the above system wherein the valve construction itself has a check valve means therein to provide for the aforementioned function, thereby eliminating costly tube plumbing and also the possibility of improper hookup.

In particular, one embodiment of this invention provides a condition responsive valve construction having valve seat means disposed between a pair of ports to interconnect the same together and having valve member means for opening and closing the valve seat means in response to a condition sensed thereby. A by-pass passage means is formed in the valve member means for fluidly interconnecting the ports together even though the valve seat means is closed by the valve member means, the by-pass passage means having check valve means therein to permit fluid flow through the by-pass passage means in only one direction. The valve construction has restrictor means fluidly interconnecting the ports together even though the valve seat means is closed by the valve member means and the by-pass passage means is closed by the check valve means.

In this manner, one port can be interconnected to the manifold and the other port can be interconnected to the vacuum controlled device whereby the check valve means substantially blocks the fluid interconnected between the manifold and the control device when the manifold vacuum value is less than the vacuum value of the control device and the temperature of the engine is below the certain temperature whereby the check valve means of this invention forms part of the self-contained structure of the valve construction of this invention. The vacuum value between the manifold and the control device can be equalized by the restrictor means at a controlled rate should the loss of vacuum at the manifold last for a certain period of time even though the check valve means is in the closed condition when the temperature of an engine is below the certain temperature thereof.

Accordingly, it is an object of this invention to provide an improved condition responsive valve construction having one or more of the novel features of this invention as set forth above or hereinafter shown or described.

Another object of this invention is to provide a method of making a condition responsive valve construction, the method of this invention having one or more of the novel features of this invention as set forth above or hereinafter shown or described.

Another object of this invention is to provide an improved control system for an internal combustion engine, the control system of this invention having one or more of the novel features of this invention as set forth above or hereinafter shown or described.

Other objects, uses and advantages of this invention are apparent from a reading of this description which proceeds with reference to the accompanying drawings forming a part thereof and wherein.

Figure 1:
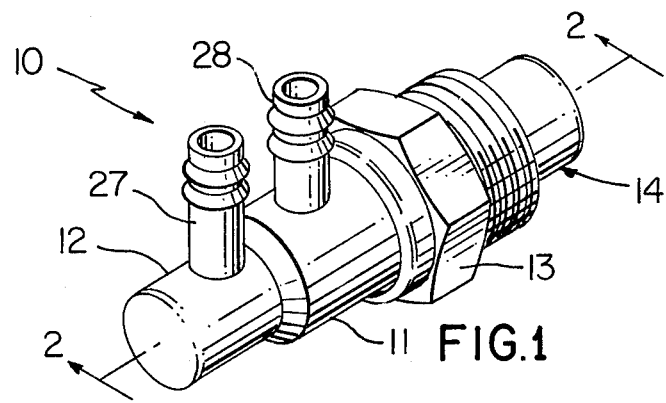
FIG. 1 is a perspective view of the improved condition responsive valve construction of this invention.

While the various features of this invention are hereinafter described and illustrated as being particularly adapted to provide a condition responsive valve construction for an engine control system, it is to be understood that the valve construction of this invention can be utilized in other systems as desired.

Therefore, this invention is not to be limited to only the embodiments illustrated in the drawings, because the drawings are merely utilized to illustrate one of the wide variety of uses of this invention.

Figure 2:
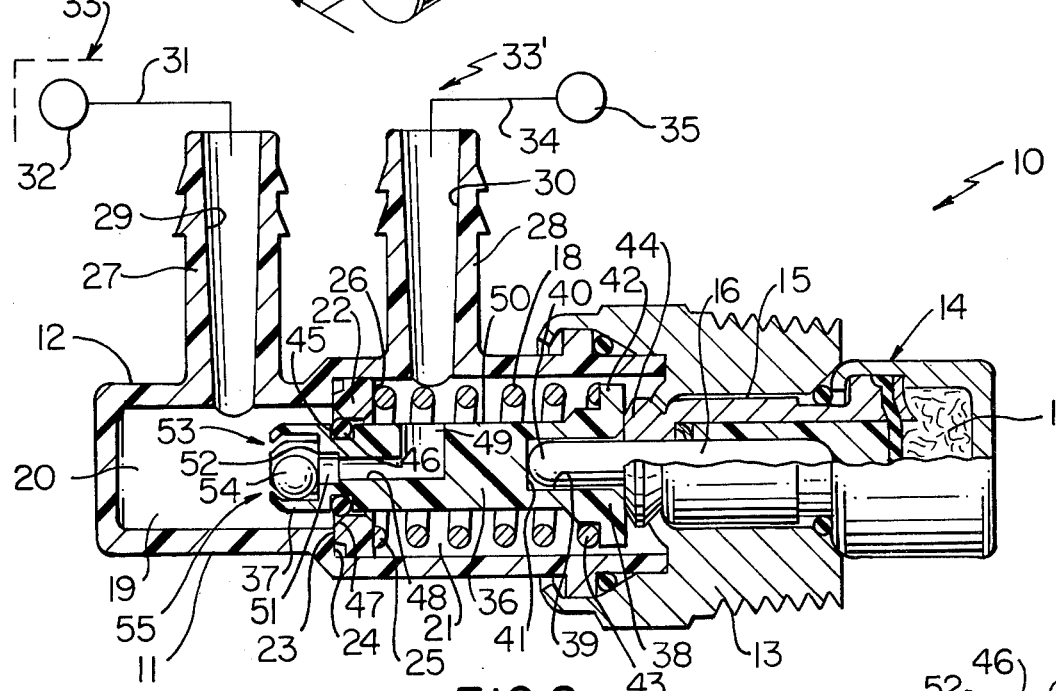
FIG. 2 is an enlarged cross-sectional view taken on line 2—2 of FIG. 1, FIG. 2 also schematically illustrating the engine control system utilizing the valve construction of FIGS. 1 and 2.
Figure 3:
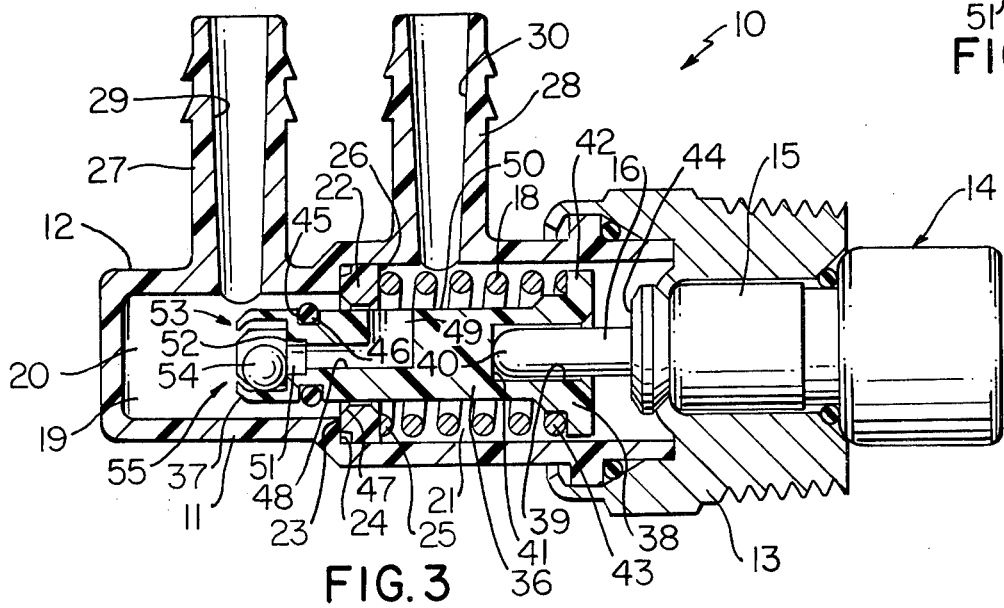
FIG. 3 is a view similar to FIG. 2 and illustrates the valve construction in another operating position thereof.

Referring now to FIGS. 1, 2 and 3, the improved condition responsive valve construction of this invention is generally indicated by the reference numeral 10 and comprises a housing means 11 formed from two housing parts 12 and 13 suitably secured together and carrying a piston and cylinder temperature responsive device 14 that is well known in the art and comprising a cylinder member 15 carrying a piston member 16 which is adapted to be forced or extended to the left in FIG. 2 upon an increase in temperature that causes the expansion of a wax-like charge 17 in the cylinder member 15. Conversely, the wax charge 17 contracts upon a decrease in the temperature thereof permitting the piston member 16 to retract into the cylinder member 15 under the force of a compression spring 18 in a manner hereinafter described.

The housing means 11 has an internal chamber 19 separated into two parts 20 and 21 by an annular valve seat member 22 having one side 23 compacted against an internal annular shoulder 24 of the housing part 12 because the compression spring 18 has one end 25 bearing against the other side 26 of the valve seat member 22 as illustrated.

The housing part 12 has a pair of integral nipples 27 and 28 extending outwardly therefrom and respectively having ports or passages 29 and 30 formed therethrough and respectively interconnecting with the sections 20 and 21 of the chamber 19 of the housing means 11.

The port 29 of the nipple 27 is adapted to be interconnected by suitable conduit means 31 to the vacuum manifold 32 of an internal combustion engine that is generally indicated by the reference numeral 33. Similarly, the port 30 of the nipple 28 is adapted to be interconnected by suitable conduit means 34 to a vacuum operated control device 35 of the engine 33 wherein the device 35 can be utilized to control any desired structure of the internal combustion engine 33, such as the distributor thereof or the like, whereby the valve construction 10 forms part of the control system 33' for the engine 33.

An axially movable valve member or plunger 36 is disposed in the chamber 19 of the housing means 11 and has opposed ends 37 and 38, the end 38 being interrupted by a bore 39 which receives the projecting end 40 of the piston 16 of the temperature responsive device 14 therein as illustrated whereby the end 40 of the piston 16 is adapted to abut against the end wall 41 of the valve member 36 to move the same to the left in the drawings upon the outward extension of the piston 16 in a manner hereinafter described and as illustrated in FIG. 3.

The end 38 of the valve member 36 also has an outwardly directed annular part 42 against which the other end 43 of the compression spring 18 engages to tend to force the valve member 36 to the right in the drawings, the valve member 36 bottoming out against an end wall 44 of the cylinder member 15 of the temperature responsive device 14 to thereby limit movement of the valve member 36 to the right even though the piston 16 may retract further into the cylinder member 15 from the position thereof illustrated in FIG. 2.

The valve member 36 has an annular groove 45 therein which receives an annular resilient member 46 that is adapted to sealingly engage against a beveled surface 47 of the valve seat member 22 to seal close the valve seat member 22 when the valve member 36 is in the position of FIG. 2 to thereby prevent fluid communication between the ports 29 and 30 through the valve seat member 22 at the surface 47 thereof, the force of the spring 18 tending to move the valve member 36 to the right in the drawings maintaining the sealing member 46 in sealing contact with the surface 47 of the valve seat member 22. However, when the valve member 36 is moved to the left as illustrated in FIG. 3 by the temperature responsive device 14 sensing a temperature above a certain temperature, such as 120° F. for a typical engine 33, the annular member 46 is moved away from the valve seat 22 whereby the ports 29 and 30 can be fully fluidly interconnected through the now opened valve seat 22 for a purpose hereinafter described.

The valve member 36 has a by-pass passage 48 formed therein, one end 49 of the by-pass passage 48 interrupting the outer peripheral surface 50 of the valve member 36 in such a position thereof that the end 49 of the by-pass passage 48 will always be in fluid communication with the section 21 of the cavity 19 regardless of the position of the valve member 36 relative thereto as illustrated in FIGS. 2 and 3.

The other end 51 of the by-pass passage 48 is interconnected by a valve seat 52 to a slotted cage-like portion 53 of the end 37 of the valve member 36 which has a ball valve member 54 captured therein and normally being held in an open position by gravity from the valve seat 52 as illustrated in FIG. 2 and as long as the vacuum value in the manifold 32 is greater than the vacuum at the vacuum control device 55 when the main valve seat 22 is closed as will be apparent hereinafter.

The ball valve member 54 can comprise a solid rubber ball so as to resiliently seal the valve seat 52 in the manner illustrated in FIG. 2A for a purpose hereinafter described or the valve seat 52 can be formed from an annular rubber-like member and the ball valve member 54 could be formed of steel or other suitable hard material as desired.

In any event, it can readily be seen that the ball valve member 54 can be readily captured in the cage-like part 53 of the end 37 of the valve member 36 by having the cage-like part 53 turned over at the ends thereof as illustrated in FIG. 2 after the ball 54 has been disposed in the cage-like part 53.

In this manner, the ball valve member 54 and seat 52 provide a check valve means that is generally indicated by the reference numeral 55 and is utilized for closing the by-pass passage 48 in such a manner that the same only permits fluid flow through the by-pass passage 48 in one direction as will be apparent hereinafter.

Also, it can be seen that the check valve means 55 forms parts of the self-contained structure of the condition responsive valve construction 10 of this invention which operates in a manner now to be described.

When the valve construction 10 of this invention is interconnected into the control system 33' of the internal combustion engine 33 by having the nipple 27 thereof interconnected to the engine manifold 32 and the nipple 28 interconnected to the vacuum controlled device 35 as illustrated in FIG. 2, the temperature responsive device 14 has been so selected that the same will only open the main valve seat 22 when the device 14 senses a certain temperature and above, such as an engine temperature of 120° F., and will maintain the valve member 36 in the valve seat closed position of FIG. 2 as long as the engine temperature remains below 120° F.

Figure 2A:
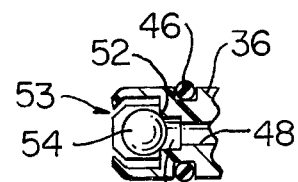
FIG. 2A is a fragmentary view similar to FIG. 2 and illustrates the check valve of the valve construction of FIG. 2 in a closed condition thereof.

Thus, upon initial engine start-up wherein the engine 33 is cold so that the temperature responsive device 14 is maintaining the valve member 36 in the closed condition of FIG. 2, the creation of a vacuum in the manifold 32 by the engine 33 will pull a vacuum in the controlled device 35 through the by-pass passage 48 of the valve member 36 because the ball valve member 54 will be in the open position of FIG. 2 and if the same had been stuck on the valve seat 52 in the condition of FIG. 2A, the resulting pressure differential now being created across the ball valve member 54 will cause the ball valve member 54 to move to the open condition of FIG. 2. Thus, the check valve means 55 permits fluid flow through the by-pass passage means 48 in the direction of the port 29 so that the vacuum controlled device 35 can perform its operating function, such as controlling the distributor of the engine 33.

However, if during the initial start-up of the engine 33, the manifold 32 should substantially lose its vacuum, such as through an increased acceleration of the engine 33, the check valve member 54 will be moved to the closed condition of FIG. 2A because of the now resulting reverse pressure differential being created across the ball valve member 54 so that the controlled device 35 will not lose its vacuum and, thus, disrupt the operation of the device being controlled thereby during the temporary loss of vacuum at the manifold 32.

Thus, it can be seen that the check valve means 55 of this invention prevents the controlled device 35 from losing its vacuum should the value of the vacuum at the manifold 32 decrease below the vacuum value at the control device 35 when the temperature of the engine 33 is below the certain temperature of 120° F.

However, when the temperature of the engine 33 reaches the certain temperature of 120° F., the wax charge 17 has expanded in such a manner that the same has driven the piston 16 to the left as illustrated in FIG. 3 to fully open the valve seat 22 so that the port 29 is always interconnected to the port 30 through the opened valve member 22 as long as the temperature of the engine 33 remains at or above the certain temperature of 120° F.

Therefore, it can be seen that this invention provides an improved self-contained condition responsive valve construction which will always interconnect the manifold 32 to the controlled device 35 when the temperature of the engine is above a certain temperature and will only permit the manifold 32 to be interconnected to the controlled device 35 when the temperature of the engine 33 is below the certain temperature and if the vacuum value at the manifold 32 is greater than at the controlled device 35 as the check valve means 55 will disconnect the manifold 32 from the controlled device 35 should the vacuum value at the manifold 32 be less than the vacuum value at the controlled device 35 when the temperature of the engine 33 is below the certain temperature thereof.

It may be desired to have the controlled device 35 interconnected to the manifold 32 through a controlled bleed or restrictor means so that even though the check valve means 55 is in the closed condition of FIG. 2A when the temperature of the engine 33 is below the certain temperature thereof, the vacuum value between the manifold 32 and the control device 35 can be equalized at a controlled rate should the loss of vacuum at the manifold 32 last for a certain period of time.

Figure 4:
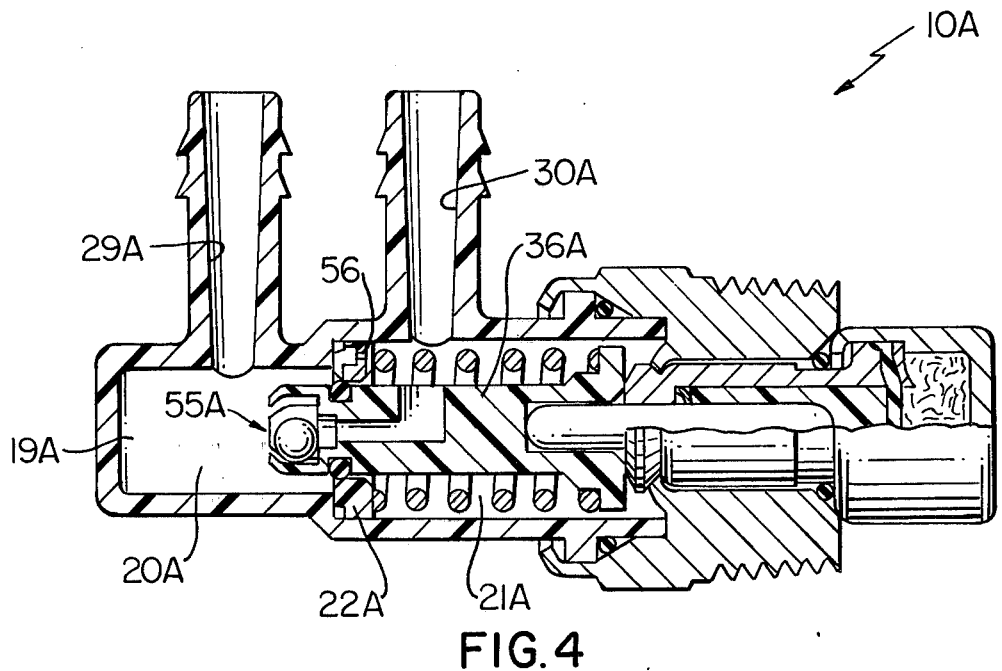
FIG. 4 is a view similar to FIG. 2 and illustrates another embodiment of the valve construction of this invention.

Accordingly, one such valve construction of this invention that provides such a controlled bleed is generally indicated by the reference numeral 10A in FIG. 4 and parts thereof similar to the valve construction 10 previously described are indicated by like reference numerals followed by the reference letter "A".

As illustrated in FIG. 4, the valve construction 10A is substantially identical to the valve construction 10 except that the annular valve seat member 22A thereof has a restricted passage 56 formed therethrough to always interconnect the sections 20A and 21A of the chamber 10A together at a controlled bleed rate to thereby permit the vacuum value of the ports 30A and 29A to equalize when the valve seat 22A is in a closed condition by the valve member 36A and the check valve means 55A is in a closed condition thereof for the reasons previously set forth.

Figure 5:
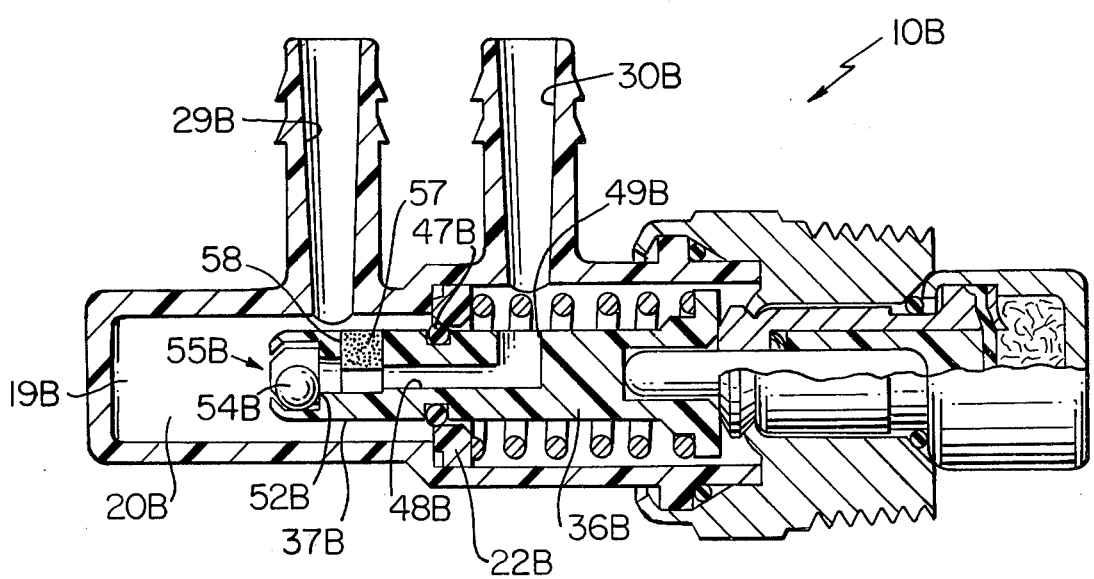
FIG. 5 is a view similar to FIG. 4 and illustrates another embodiment of the valve construction of this invention.

Another such valve construction of this invention that provides such a controlled bleed is generally indicated by the reference numeral 10B in FIG. 5 and parts thereof similar to the valve construction 10 previously described are indicated by like reference numerals followed by the reference letter "B".

It can be seen that the valve construction 10B of FIG. 5 is substantially identical to the valve construction 10 previously described except that the end 37B of the valve member 36B has a greater length from the annular valve seat closing member 47B thereof to provide space for a porous restricting member 57 to be disposed in a transverse opening 58 in the valve member 36B and always fluidly interconnect the section 20B of the cavity 19B to the by-pass passage 48B intermediate the check valve means 55B and the end 49B of the by-pass passage 48B so that the port 30B is always fluidly interconnected at a controlled rate through the porous block 57 to the port 29B even though the valve member 36B is maintaining the valve seat 22B in a closed condition and the ball valve member 54B is maintaining the check valve seat 52B in a closed condition thereof for the reasons previously set forth.

Therefore, it can be seen that the valve construction of this invention can be provided with a restrictor means in the self-contained structure thereof to permit timed pressure equalization between the two ports thereof that are controlled by the main valve member and the check valve means thereof.

Accordingly, it can be seen that this invention provides an improved self-contained condition responsive valve construction and method of making the same as well as an improved control system for an internal combustion engine or the like.

While the forms and methods of this invention, now preferred, have been illustrated and described as required by the Patent Statute, it is to be understood that other forms and method steps can be utilized and still fall within the scope of the appended claims.

What is claimed is:

1. In a condition responsive valve construction having valve seat means disposed between a pair of ports to interconnect the same together and having valve member means for opening and closing said valve seat means in response to a condition sensed thereby, said valve member means having a by-pass passage means therein for fluidly interconnecting said ports together even though said valve seat means is closed by said valve member means, said by-pass passage means having check valve means therein to permit fluid flow through said by-pass passage means in only one direction, the improvement wherein said valve construction has restrictor means fluidly interconnecting said ports together even though said valve seat means is closed by said valve member means and said by-pass passage means is closed by said check valve means.

2. A valve construction as set forth in claim 1 wherein said restrictor means is provided through said valve seat means.

3. A valve construction as set forth in claim 1 wherein said restrictor means is provided in said valve member means.

4. A valve construction as set forth in claim 3 wherein said restrictor means leads from the exterior of said valve member means on one side of said valve seat means and interconnects with a part of said by-pass passage means that is always in fluid communication with the other side of said valve seat means.

5. A valve construction as set forth in claim 1 wherein said construction has a housing means carrying said valve seat means and said valve member means, said valve seat means being annular and said valve member means comprising a plunger that axially moves in said annular valve seat means.

6. A valve construction as set forth in claim 5 wherein said plunger has a free end portion that projects beyond one side of said valve seat means in all positions of said plunger, said by-pass passage means having one end thereof leading to the exterior of said plunger at said free end portion thereof.

7. A valve construction as set forth in claim 6 wherein said check valve means comprises a valve seat in said by-pass passage means at said free end portion of said plunger and a valve member for opening and closing said valve seat.

8. A valve construction as set forth in claim 7 wherein said free end portion of said plunger has said restrictor means therein that leads from the exterior of said free end portion to said by-pass passage means intermediate said check valve seat and the other side of said valve seat means to always fluidly interconnect said ports together.

9. A valve construction as set forth in claim 5 wherein said annular valve seat means has said restrictor means passing therethrough outboard of said plunger to always fluidly interconnect said ports together.

* * * * *